ature of the page is at a maximum. The actual breaking away of the bound-
ary layer is thus owing to its becoming a reactance in the
acoustic circuit in which the wave is created, whereby it
becomes exposed to acoustic wave agitation. This dissi-
pation of the boundary layer results in a sharp increase
in heat transmission characteristics.

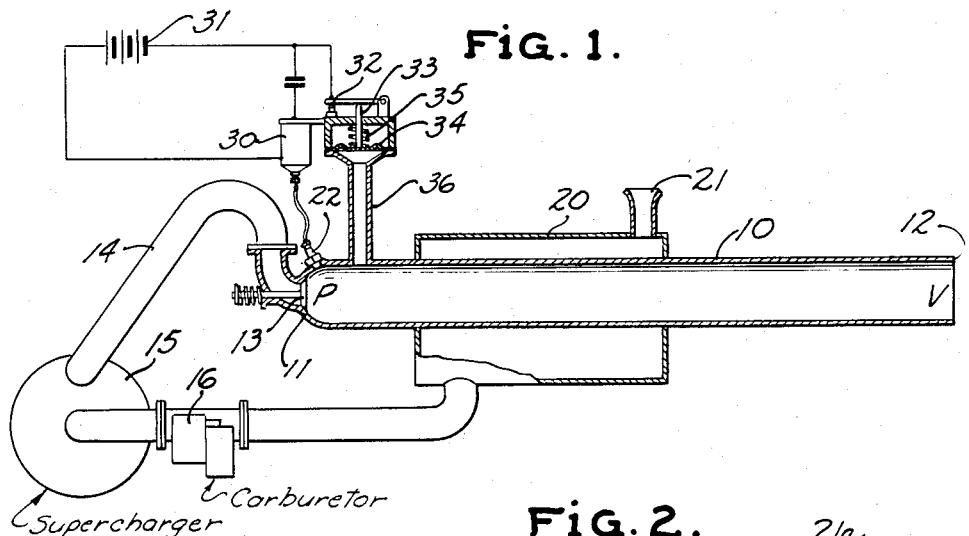
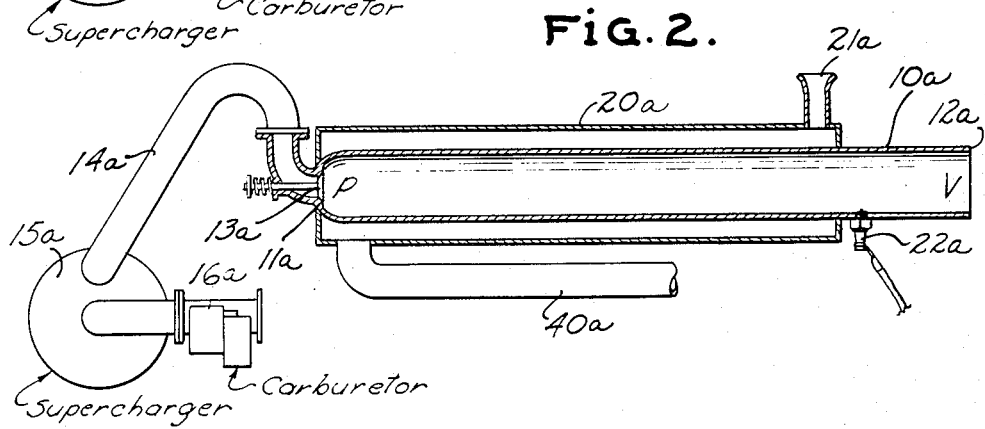
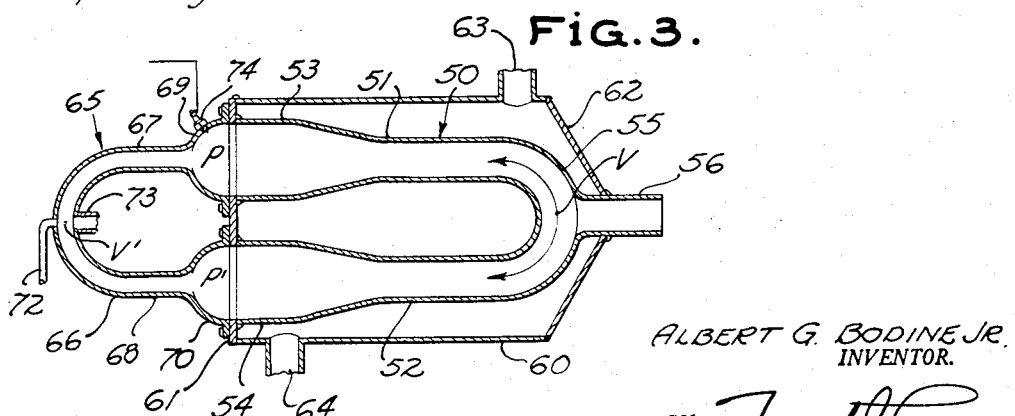

The invention will be understood best by referring now
to certain illustrative embodiments thereof, reference for this purpose being had to the accompanying drawings,
in which:

Figure 1 is a longitudinal sectional view of a resonant
jet engine and heat exchanger in accordance with the
invention;

Figure 2 is a similar view of a modified form of the
invention; and

Figure 3 is a similar view of another modified form of
the invention.

In Figure 1, numeral 10 designates an acoustic reso-
nant cavity, here in the form of a metallic sonic pipe
having a closed head end 11 and an open end 12 through
which products of combustion are discharged to atmos-
phere. A combustible mixture is introduced into the zone
P of pipe 10 through an intake valve 13, which may be
of the spring-loaded type, so that it opens whenever the
pressure in a fuel induction passage 14 exceeds the pres-
sure in zone P by a predetermined amount. A super-
charger 15, driven by means not shown, supplies the air-
fuel mixture to the fuel induction passage 14. A car-
buretor 16 forms and delivers the fuel-air mixture to the
intake of the supercharger. The air entering carburetor
16 passes first through a preheater in the form of a heat
exchanger 20, comprising a jacket around pipe 10 and to
which air is supplied through a mouth 21, thus obtaining
a heat exchange between the incoming air and the heated
column of combustion gases contained inside pipe 10
during the operation of the engine.

The charge of fuel introduced to the combustion zone
at P by way of passage 14 and valve 13 is ignited as by
means of spark plug 22, and the resulting explosion
produces a sharp pressure rise at zone P, causing a wave
of compression to be launched down the column of gas
contained in pipe 10, this compression wave traveling
with the speed of sound in the heated combustion gases.
This compression wave will be reflected from the open
end 12 of the pipe 10 as a wave of rarefaction, which
upon reaching the zone P will produce a pressure de-
pression, causing valve 13 to open, and an additional
charge of fuel mixture to be introduced to zone P. The
described wave of rarefaction is reflected by the closed
end of pipe 10 as a wave of rarefaction traveling back
towards the open end of the pipe, and this latter wave
is in turn reflected by the open end of the pipe as a wave
of compression returning toward the head end of the
pipe. If the arrival of this wave of compression coincides
with the next ignition of fuel-air mixture and resulting
pressure increase at zone P, a re-enforced pressure peak
occurs at P, with increased fuel density and increased
compression ratio, thereby very materially improving the
combustion cycle. Also, to follow on with the succeeding
cycle, a re-enforced or augmented wave of compression
is started down the pipe 10 from combustion zone P, and
the cycle as previously described is then repeated, but
with the pressure cycle traveling through greater ampli-
tude swing as compared with the initial cycle. Under
these conditions, a condition of quarter-wave resonance
is established, with a pressure anti-node (zone of maxi-
mum pressure variation) at P, and a velocity anti-node V
(zone of maximum velocity variation) at the far, open
end 12 of the pipe, which functions as a guide for a stand-
ing wave in the combustion gases. While it is found in
practice that the returning wave of compression so in-
creases the pressure and density of the fuel-air mixture at
the zone P as to cause ignition even without the con-
tinued use of spark plug 22, apparently by reason of an
attenuated "after-flame" remaining in the zone P through-
out the reduced pressure part of the cycle, the embodi-
ment of Figure 1 includes an automatic timing system
for energization of the spark plug 22. As shown, the spark plug is connected to the high voltage terminal of a conventional induction coil 30, the low voltage circuit of which includes battery 31 and a make-break switch 32, the latter being actuated by a plunger 33 connected to a diaphragm 34 urged in a direction to close the make and break switch by a spring 35. One side of the diaphragm is connected through passage 36 with the gas column in pipe 10 at zone P. Upon the appearance of each positive pressure peak or pulse at P, diaphragm 34 moves upwardly to break the low voltage circuit, causing the high tension coil to produce a spark at plug 22. This spark will thus be synchronized with the appearance of positive pressure pulses at zone P.

As explained, the operation of the system produces quarter-wave resonance, with a pressure anti-node at P, and a velocity anti-node V at the open end of the pipe. In other words, a quarter-wave length standing wave is established in the gas column in the pipe. This standing wave results in scrubbing the hot combustion gases against the inner surface of pipe 10, inhibiting any tendency toward accumulation of heat-insulating boundary layers of stagnant gases adjacent the inside surfaces of the pipe. The velocity action of the standing wave at the velocity antinode region, and the pressure fluctuation action at the pressure antinode region, gradually merging into one another along the pipe 10, both have a dispersive action on the gaseous boundary layer tending to cling to the inside surfaces of the pipe. The boundary layer gases actually become a reactance in a distributed constant type of acoustic wave system, and experience disruptive acoustic forces owing thereto. The standing wave action in the column of gases also induces sound wave transmission within or through the walls of pipe 10 which form the guide for the standing wave, producing a wave action at the outside surface of the pipe which is in turn transmitted to the fluid inside jacket 20. Stagnant boundary layer conditions adjacent the external surfaces of pipe 10 within jacket 20 are thereby reduced or eliminated, enabling intimate contact of the unheated air with the exterior of heated pipe 10, and hence increasing the heat exchange rate, and therefore the heat input to the air-fuel mixture to be introduced into pipe 10 for combustion. By this means I believe I have accomplished more effective pre-heating of intake air for engine combustion than has heretofore been known.

Figure 2 shows an embodiment of the invention according to which the heated fluid is to be used, not for a supply to the engine, but for some separate purpose. The engine in this instance is similar in all essential respects to that of Figure 1, including pipe 10a having a closed head end 11a and open end 12a for discharge of products of combustion. The combustible mixture is introduced into zone P of pipe 10a through spring-loaded intake valve 13a, which valve opens whenever the pressure in fuel induction passage 14a exceeds the pressure at P by a predetermined amount. Supercharger 15a supplies the air-fuel mixture to fuel induction passage 14a. Carburetor 16a delivers the air-fuel mixture to the intake of the supercharger, and is shown in Figure 2 as taking its air from atmosphere, although it would be within the scope of the invention to have the carburetor receive a portion of the air preheated by the heat exchanger presently to be described.

Heat exchanger 20a, comprising a jacket around pipe 10a to which air is supplied through mouth 21a, has a heated fluid delivery pipe 40a leading to some means for utilizing the same, not shown. The fuel charge introduced to the combustion zone at P is ignited as by means of spark plug 22a, and the resulting explosion produces a pressure cycle and a standing wave as described in connection with the embodiment of Figure 1. No automatically timed means is shown for the energization of the spark plug in the instance of Figure 2, since as described earlier, the apparatus is actually found to operate, once started, without use of electric ignition. In this case, the spark plug is energized once, for starting purposes, through any suitable electrical energizing device, not shown, and combustion then occurs on each pressure peak at zone P as a result of the high compression and increased fuel density, which causes the fuel to ignite by reason of a residual or lingering flame always present at the zone P, but too attenuated excepting at the pressure peak phases of the cycle to ignite the fuel mixture.

Heat transfer from the heated combustion gases inside pipe 10a to the fluid passing through heat exchanger 20a proceeds in the manner described in connection with Figure 1, the sound wave action prevalent inside the pipe 10a acting to scrub the hot combustion gases against the inside of the pipe and thereby prevent boundary layer accumulation thereon, and acting also through the walls of the pipe to prevent boundary layer conditions in the fluid surrounding the pipe inside the heat exchanger. The wave system is of the distributed constants type, and the boundary layer becomes a reactance in the acoustic circuit, with resulting continuous acoustic disruptive action thereon. The rate of heat transfer is thereby very materially improved. The embodiment of Figure 2 accordingly comprises a resonant jet engine employed as a heat source for a body of fluid to be heated by heat exchange, the standing wave maintained inside the engine removing boundary layer conditions adjacent the engine wall through which the heat is to be transferred and thereby appreciably increasing the heat transfer rate.

Figure 3 shows another modification, designed particularly for air heating, where the heated air is to be used for a purpose other than as a supply to the engine. Numeral 50 designates generally a U-shaped sonic pipe, having legs 51 and 52, formed at their ends with enlarged sections 53 and 54, respectively, to provide combustion chambers. The two legs 51 and 52 are connected by semi-circular pipe section 55, and the latter has, opening from the midpoint of its convex side, a fluid discharge pipe 56. The U-tube as thus described is surrounded by heat exchanger 60, which comprises a jacket having an end wall 61 through which open the enlarged end portions 53 and 54 of the U-tube, and with end wall 62 joined to discharge pipe 56 just beyond pipe section 55, as clearly shown. The jacket also has air inlet 63 and outlet 64. An air and fuel induction system 65 is here shown in the form of a U-tube 66 having legs 67 and 68 formed with enlarged end portions 69 and 70, respectively, bolted or otherwise fastened to heat exchange end wall 61 so as to communicate with the enlarged end portions 53 and 54 of the sonic U-tube 50. Combustion zones or chambers are thus formed by the pipe portions 53, 69, and 54, 70. A fuel injection pipe 72 discharges inside U-tube 66 at the midpoint thereof, and an air induction pipe 73 discharges inside U-tube 66 at the midpoint thereof and preferably on its concave side, as shown. A spark plug 74, used only for starting, is mounted in the enlarged induction pipe portion 69.

In operation, fuel introduced through pipe 72 and air introduced through pipe 73 travel around the two legs 67 and 68 of U-tube 66 to the two combustion zones, which coincide with pressure anti-nodes P and P' of a sonic standing wave set up as presently to be described. The air may be introduced through pipe 73 either by means of a blower, not shown, or by suction developed in a manner to be described hereinafter. The fuel mixture reaching the zone P is ignited by means of spark plug 74 and the resulting explosion sends a positive pressure wave pulse in the column of gases extending around the U-tube 50 to the other combustion zone at P'. As the resulting pressure peak builds up at P', the fuel density increases sufficiently that an explosion occurs thereat, sending a positive pressue wave pulse around the U-tube 50 in a reverse direction. This last mentioned pressure wave, upon reaching the zone P, produces a further explosion at P, and so on. Alternate explosions thus occur at P and P', each sending a pressure wave through the column of gases around the U-tube. The explosions are found to occur at the two zones P and P' at a resonant frequency of the pipe 50, considered as a half-wave sonic pipe. Also, an acoustic standing wave is set up in the column of gases in said pipe, the zones P and P' being pressure anti-node zones, and a velocity anti-node V appears at the juncture of the two legs 51 and 52, opposite the discharge pipe 56. At the zone V, the combustion gases oscillate back and forth, as indicated by the double-headed arrow. A standing sound wave is thus established in the U-tube, with maximum pressure variation oznes at P and P', and with a maximum velocity variation zone at V, the hot combustion gases first rushing in one direction around the curved portion of the U-tube, and then in the opposite direction, in an alternating or oscillating type of flow. The system is of the distributed constants type, and the boundary layer becomes a reactance in the acoustic circuit, with resulting continuous disruptive action thereon.

In addition to the oscillating motion of the gas in the region V owing to the standing sound wave, there is a relatively slower continuous flow of combustion gases down the two legs 51 and 52 and out the discharge pipe 56. This discharge of combustion gases from pipe 56 is promoted by centrifugal forces acting on the combustion gases in the curved section 55 of the U-tube. The gas velocity is very high, and substantial centrifugal forces are set up in the combustion gases traveling around the curved section 55, causing them to be crowded radially outward toward the outer peripheral wall, and thereby setting up a substantial pressure differential in a radial direction across the pipe section 55 opposite or in line with the discharge pipe 56. Thus there is an elevated pressure at the outer wall, aiding fluid discharge through the pipe 56.

In the embodiment of Figure 3, the air and fuel induction U-tube 66 is given a length equal to a half-wave length for the resonant frequency of the pipe 50, and a standing wave occurs also in the pipe 56, with a velocity anti-node V' at the midpoint. The U-tube 66 is considerably shorter than the U-tube 50, because of the difference in temperature of the gases in the two U-tubes, the highly heated gases in the U-tube 50 resulting in an increase in the velocity of sound, and a corresponding increase in wave length for a given wave frequency. Thus, the distances from the point of air intake into U-tube 66 to the two combustion chambers at P and P' are equal to quarter wave lengths for the sound wave set up in the system, and under these conditions, as set forth in my Patent No. 2,731,795, the two legs 67 and 68 feeding fuel mixture to the two combustion zones are intake pipes of high acoustic impedance capable of opening directly into the combustion chambers without use of valves, and without loss of sonic wave energy from the U-tube 50 back into the induction system. Owing to the velocity anti-node condition established at V', in line with air intake pipe 73, the air and fuel mixture within the U-tube 66 oscillates at the sonic frequency of the system around the curved section of the U-tube 66, and centrifugal forces are set up in a radial direction across the induction pipe creating a pressure depression at the concave side thereof, which aids in sucking air into the system through the pipe 73.

The acoustic wave action along the column of gases, and in particular the vigorous, sonic frequency gas oscillations in the velocity anti-node region of U-tube 50, scrubs away stagnant boundary layer gases, and thus increase the heat exchange rate. An important advantage of the system of Figure 3 over the earlier decribed embodiments from a heat exchange standpoint is that the heat exchange jacket encloses the entirety of the sonic pipe 50, including particularly the entirety of the velocity anti-node portion of the pipe. In the earlier described embodiments, a certain length of the sonic pipe adjacent the discharge outlet operates at a relatively low temperature, resulting from the alternating gas flow into and then back out of the tail of the pipe at velocity anti-node region V. Outside air is thus alternately sucked into and discharged from the tail portion of the pipe in the embodiments of Figures 1 and 2, and has a definite cooling effect, so that the heat exchanger should not enclose the tail portion of the pipe, but should terminate substantially short thereof, and considerable heat is lost. There is no such action with the system of Figure 3, the velocity anti-node region V being confined within the U-tube, and the discharge from exhaust pipe 56 being entirely unidirectional. Thus it will be seen that the heat exchange jacket, in the case of the embodiment of Figure 3, can be arranged to enclose the entirety of the hot sonic pipe, with no problem resulting from a gradual tapering off in temperature toward its discharge end.

The present illustrative embodiments of the invention have shown single engine units inside the heat exchanger jacket. For large commercial equipment, a multiplicity of the engines may obviously be installed inside a single heat exchanger jacket.

The invention has now been embodied in certain present illustrative forms of apparatus, but it will be understood that these are merely for illustrative purposes only, and that many changes in design, structure and arrangement may be made without departing from the spirit and scope of the appended claims.

I claim:
1. A heat generating plant comprising, in combination, a pulse engine of the type embodying an acoustic cavity having walls defining a conduit for a combustion gas column, said conduit having air intake and gas discharge ports, and said walls also defining a guide for an acoustic standing wave having pressure and velocity antinode regions spaced along said conduit, said cavity having a combustion chamber at a pressure antinode region of said standing wave, combustion control means in conjunction with said chamber for exciting said standing wave at an acoustic resonant frequency of said cavity, and a heat exchanger housing outside of said conduit walls, including housing walls connected to said conduit walls in a position to form a jacket chamber surrounding at least a portion of said acoustic standing wave, said chamber containing and holding a fluid to be heated in heat transfer contact with the outside surface of said conduit walls, and isolated from the gases within said conduit, an inlet through which fluid to be heated may be admitted to said chamber, and a heated fluid outlet conduit leading from said chamber toward a point of utilization located externally of said chamber, all in such manner that the acoustic standing wave in said conduit dissipates the heat insulating boundary layer of stagnant gases adjacent the inside surface of the walls thereof while heat is being generated in the combustion gas body inside said walls and transferred through said walls to the fluid within said housing.

2. A jet engine type heater comprising: an acoustic cavity in the form of a U-shaped sonic pipe having walls defining a guide for a resonant standing wave in a combustion gas body therein, combustion chambers at the ends of the two legs of said pipe comprising sound wave sources for said standing wave, and a combustion gas discharge outlet connected to the midpoint of said U-shaped sonic pipe, and wherein pressure antinodes of said standing wave are set up in the regions of said combustion chambers, and a velocity antinode is set up in a mid-portion of the sonic pipe, and a housing enclosing substantially the entirety of said U-shaped sonic pipe including the velocity antinode section thereof, said housing holding a fluid to be heated in heat transfer contact with the outside surface of said sonic pipe, whereby the acoustic standing wave in the sonic pipe dissipates the heat insulating boundary layer of stagnant gases adjacent the inside of said sonic pipe while heat is being generated in the combustion gas body inside said pipe and transferred through the walls of said pipe to the fluid within said housing.

References Cited in the file of this patent

UNITED STATES PATENTS

| 2,415,064 | McCollum | Jan. 28, 1947 |
| 2,609,660 | Tenney et al. | Sept. 9, 1952 |
| 2,745,861 | Bodine | May 15, 1956 |
| 2,795,104 | Zinner | June 11, 1957 |
| 2,796,735 | Bodine | June 25, 1957 |

FOREIGN PATENTS

| 176,838 | Great Britain | Mar. 6, 1922 |
| 532,144 | Great Britain | Jan. 17, 1941 |